Patented July 19, 1938

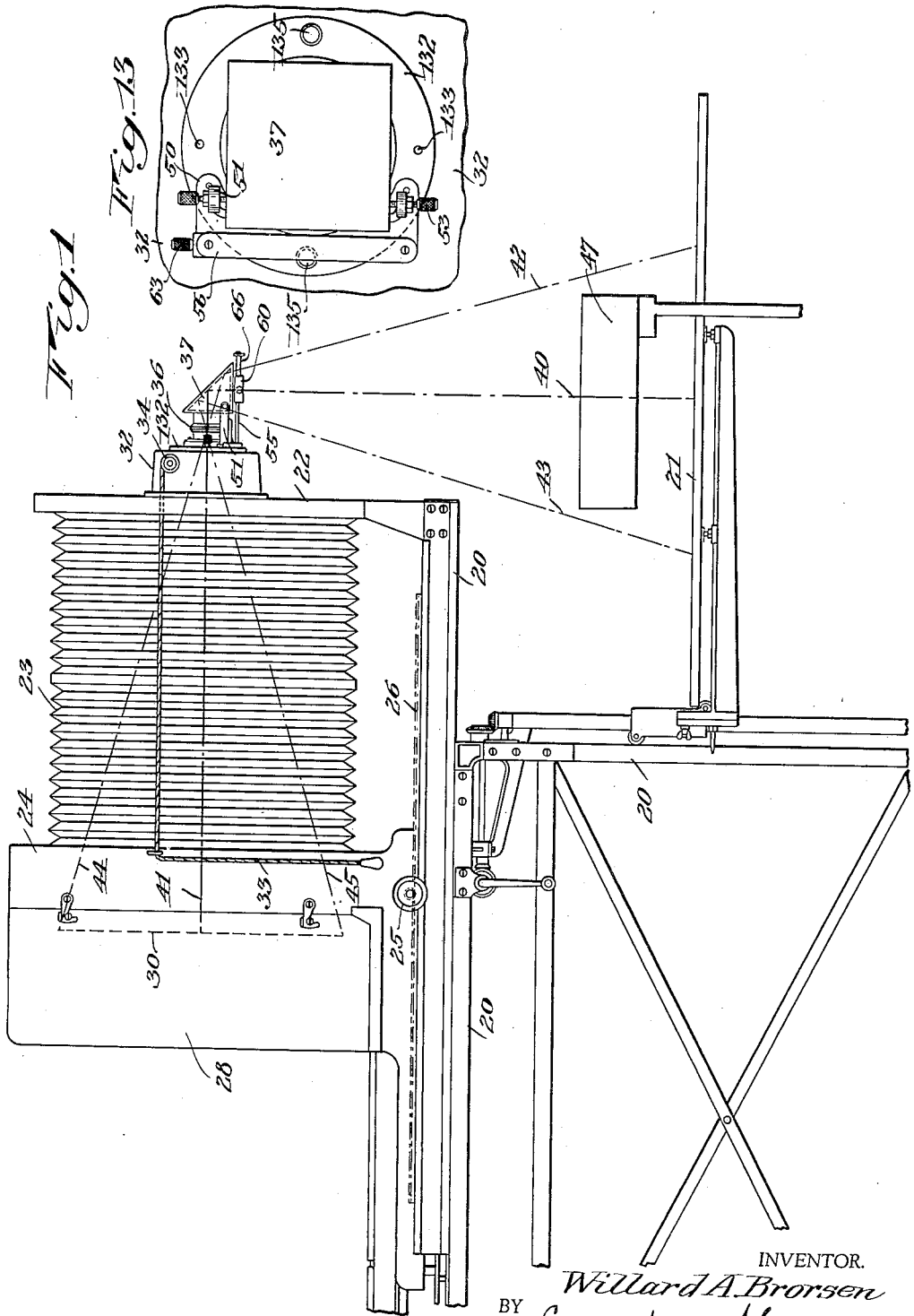

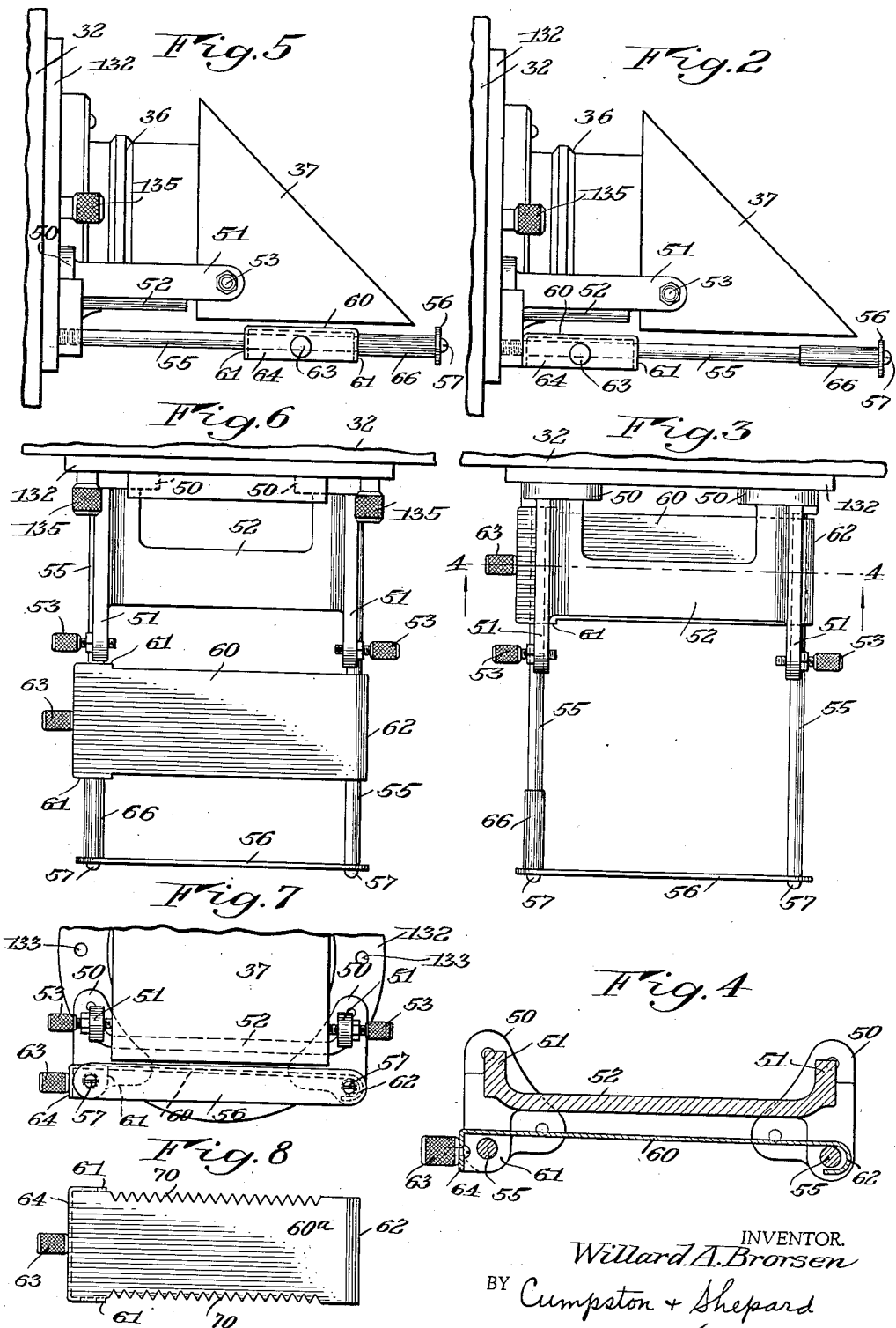

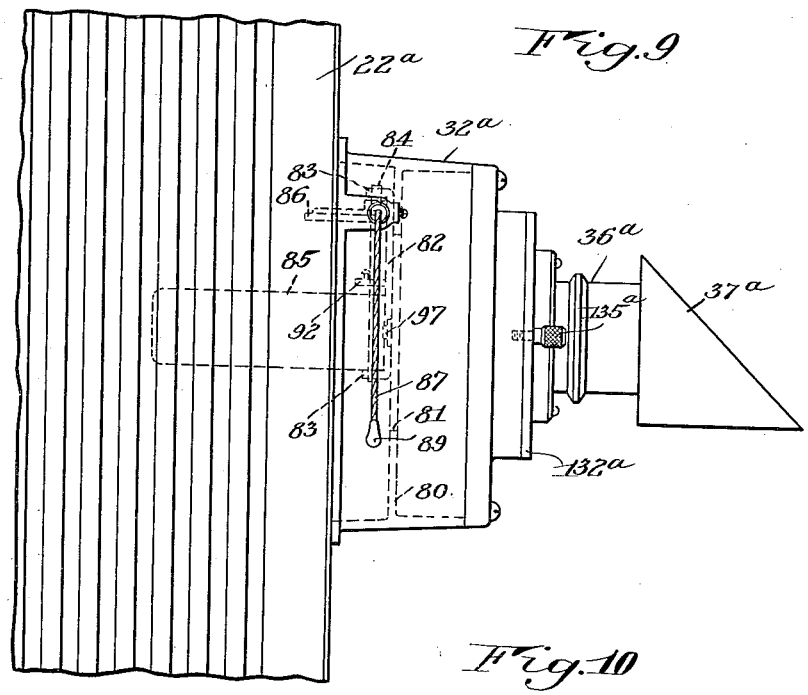
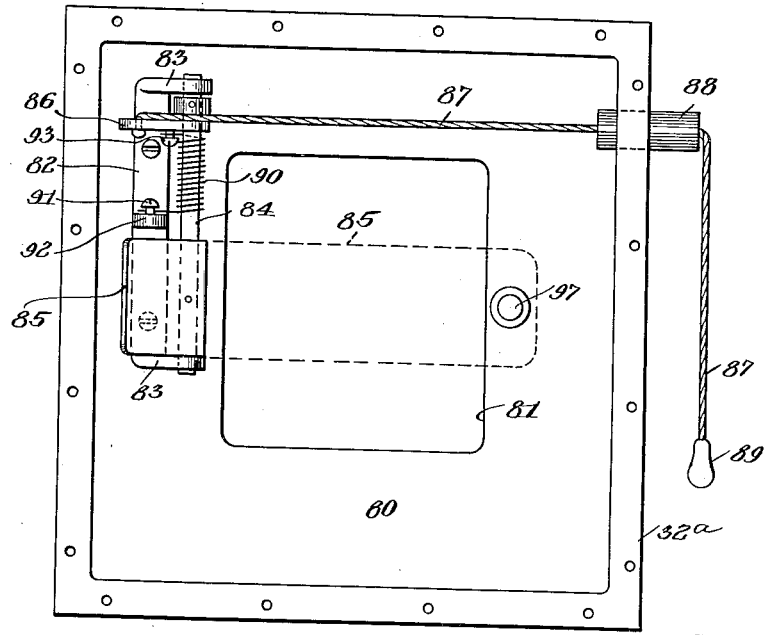

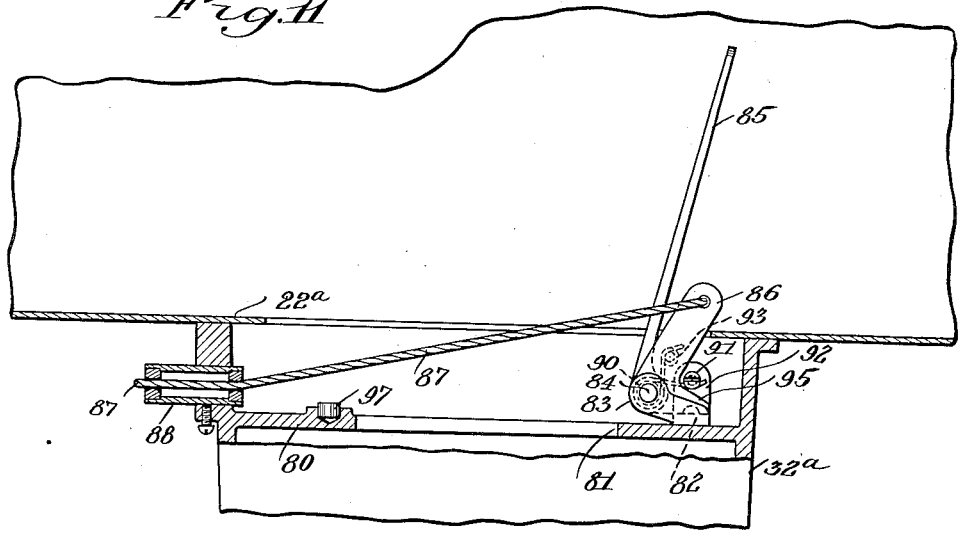
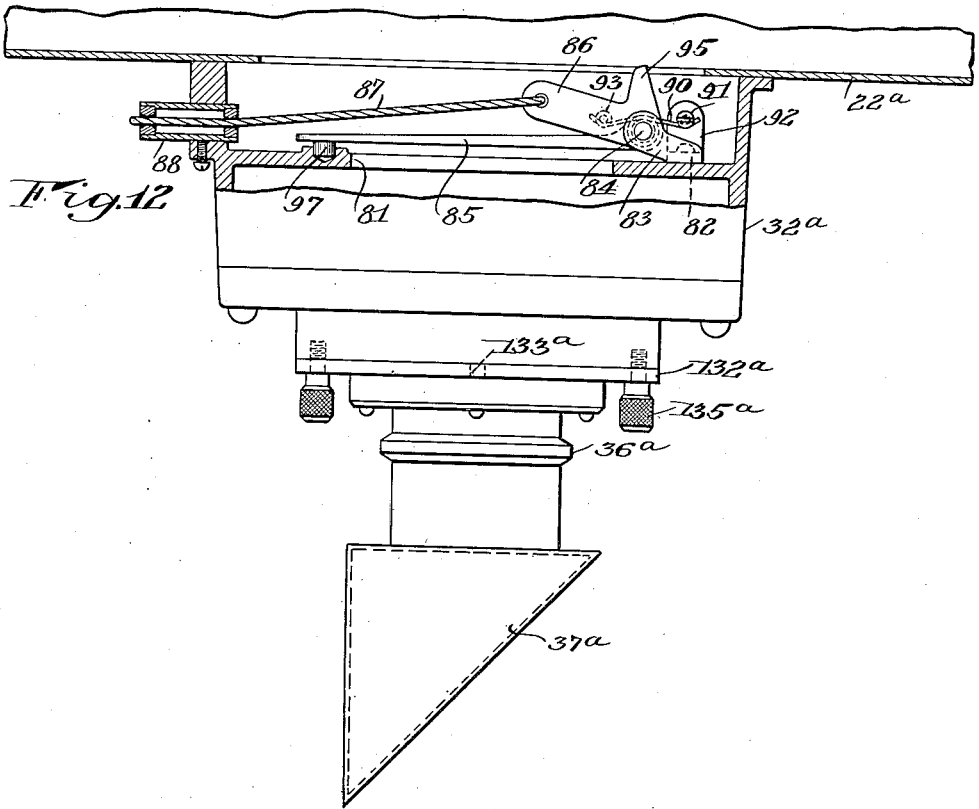

2,124,134

UNITED STATES PATENT OFFICE 2,124,134

PHOTOGRAPHIC EXPOSURE CONTROLLING APPARATUS

Willard A. Brorsen, Oakland, Calif., assignor to Photostat Corporation, Rochester, N. Y., a corporation of Rhode Island Application September 18, 1936, Serial No. 101,496

14 Claims. (Cl. 88—24)

In the practice of commercial photographic copying it is frequently found that the photographic print or reproduction appears to be under exposed along certain marginal edges with respect to the central portion of the print or reproduction. That is, if the central portion of the reproduction turns out well, and appears to be properly exposed, certain marginal portions are likely to be rather faint and appear under exposed; or if these marginal portions make a good reproduction and appear to be correctly exposed, the central portion of the print is likely to appear over exposed.

It is believed that these difficulties are due partly to the fact that the light rays passing from the marginal portions of the document or article to be reproduced to the corresponding marginal portions of the print or reproduction, must travel through a longer path than the light rays passing from the central portion of the object to the central portion of the print or reproduction; and partly due, at least in some cases, to the fact that the central portion of the print is usually better illuminated than certain marginal portions when the standard conventional form of illuminating means is used.

An object of the present invention is to overcome the above mentioned defects, and to enable the easy and rapid production of photographic prints having the appearance of approximately uniform exposure throughout the entire area of each print.

Another object is the provision of apparatus which will improve the quality of prints and enable more uniform photographic reproductions to be made.

A further object is the provision of such apparatus which can be applied easily to existing photographic copying cameras, as well as to new cameras hereafter built.

A still further object is the provision of such apparatus in a simple and sturdy form, easy to operate and not likely to get out of order.

To these and other ends the invention resides in certain improvements and combinations of parts, all as will be hereinafter more fully described, the novel features being pointed out in the claims at the end of the specification.

In the drawings:

Fig. 1 is a side elevation of photographic apparatus constructed in accordance with a preferred embodiment of the invention;

Fig. 2 is a side view of the lens, prism, and associated parts of the camera, showing the exposure controlling apparatus of the present invention in its ineffective position;

Fig. 3 is a plan of the parts shown in Fig. 2 with the lens and prism removed to show better the construction beneath;

Fig. 4 is a vertical section taken transversely substantially on the line 4—4 of Fig. 3;

Fig. 5 is a view similar to Fig. 2 showing the exposure controlling apparatus in its effective position of use;

Fig. 6 is a view similar to Fig. 3, with the controlling apparatus in the effective position shown in Fig. 5;

Fig. 7 is a front view of the parts shown in Figs. 2 and 5;

Fig. 8 is a plan of a modified form of light impeding screen which may be used in place of the form shown in Figs. 3 and 6;

Fig. 9 is a view of a portion of a camera equipped with an alternative form of the invention;

Fig. 10 is an elevation of the exposure controlling apparatus and associated parts of the camera shown in Fig. 9, viewed from the rear;

Fig. 11 is a horizontal section through the camera shown in Figs. 9 and 10, with the exposure controlling apparatus in its non-effective position;

Fig. 12 is a view similar to Fig. 11 showing the exposure controlling apparatus in its effective position, and Fig. 13 is a front view of the prism, exposure controlling means, and associated parts of the first illustrated embodiment of the invention, showing them turned at right angles to the position shown in Fig. 7.

The same reference numerals throughout the several views indicate the same parts.

In Fig. 1 there is indicated diagrammatically a known form of commercial copying camera, comprising a supporting framework 20 carrying a substantially horizontal copyholder 21 on which the document or other article to be photographed may be laid. The framework supports a camera front 22 connected by an extensible bellows 23 to a back 24 which is movable horizontally along the framework 20 for focusing, as by means of pinions controlled by the hand wheel 25 on a shaft journaled on the back 24, and meshing with racks 26 on the frame 20. The back 24 has hinged to it a magazine section 28 containing suitable means for holding sensitized sheet material (glass plates, transparent film, paper, etc.) in proper position to be exposed. The sensitized material is conveniently provided in the form of a roll of sensitized paper, successive portions of which can be fed by suitable feeding means to the position indicated by the dotted line 30, where they are extended flat in the vertically arranged focal plane of the camera, to constitute an exposure area ready to be affected by light rays focused upon it. The focal plane support, the roll of sensitized paper, the means for feeding the paper to the focal plane support, and the means for cutting off successive exposed portions of papers and transferring them to developing and fixing apparatus, may be of any known conventional form, such as the form commonly used in photographic copying cameras widely sold under the trade mark "Photostat".

On the front 22 of the camera is a shutter casing 32 containing a shutter of any conventional type such as a curtain shutter controlled by a cord 33 passing around a pulley 34 fixed to a shaft on which the shutter flap is mounted. Secured to the front of the shutter casing is a ring 132, and extending forwardly from the ring is a lens casing 36 containing suitable lens means, and on the front of this is a prism 37 of the kind commonly used in photographic copying machines of this type, the prism being arranged approximately centrally over the copyholder 21 so that light rays may pass upwardly from the document on the copyholder 21 to the prism and be bent thereby to pass through the lens means in the casing 36, and be projected by the lens means onto the exposure area 30.

The optical axis of the projection system as a whole is indicated diagrammatically by the vertical line 40 extending from the copyholder 21 upwardly to the prism 37, and by the horizontal line 41 extending from the prism 37 rearwardly through the camera to the center of the exposure area 30. A ray of light originating on the copyholder directly beneath the prism 37 would pass upwardly along the dot-dash line 40, be bent by the prism at approximately a right angle, and thence pass horizontally along the dot-dash line 41 to the sensitized sheet material. The optical axes of the lenses within the lens casing 36 are coincident with the line 41. The dot-dash lines 42 and 43 represent diagrammatically the extreme side lines of the cone or pyramid of rays passing upwardly from the photographic field or field of view on the copyholder 21, to the prism 37, while the corresponding side lines of the cone or prism of rays projected rearwardly by the prism and lens means onto the exposure area 30, are indicated at 44 and 45, respectively.

Usually the object placed on the copyholder 21 is illuminated, according to common practice, by means of two mercury vapor lamp tubes, both extending approximately horizontally and one arranged along each side of the copyholder, as indicated diagrammatically at 47 in Fig. 1. Frequently the lamp tubes are a little shorter than the length of the copyholder. With this arrangement, the two side edges of the object or copy will be well illuminated, because they are close to the two lamps extending along these edges. The central portion of the object or copy will be fairly well illuminated, since it receives good light from practically the whole length of the two light tubes on both sides of the copyholder. But those marginal portions of the object or copy which extend crosswise of the copyholder will be less well illuminated, since they are near the ends of the lamp tubes. This lesser degree of illumination of the transversely extending marginal portions of the object or copy, combined with the effect of the longer path which the light rays must travel in passing from these marginal portions of the object to the corresponding upper and lower marginal portions of the exposure area 30, in comparison to the shorter length of travel of the light rays from the central portion of the object to the central portion of the exposure areas, will produce the above mentioned commonly observed under-exposure effect at the upper and lower marginal portions of the exposure area 30.

In order to overcome this, the apparatus of the present invention provides a light impeding element or screen which may, during part of the total exposure, be placed in the path of the light rays passing from the central portion of the object toward the central portion of the exposure area, without interfering with those light rays passing from the above mentioned two marginal portions of the object to the corresponding marginal portions of the exposure area. This light obstructing or impeding screen means can be placed in its effective position during enough of the exposure to counterbalance the under-exposure effect above mentioned, so that, by the use of this invention, a substantially uniform photographic print or reproduction is obtained.

One practical form of the invention may be constructed as best shown in Figs. 2 to 7, inclusive. On the front of the ring 132 is mounted a prism holder comprising flanges 50 contacting with and screwed to the front wall of the ring, and bars 51 extending forwardly from these flanges, and a web 52 connecting the bars 51 to each other and to the flanges 50. At their forward ends, the bars 51 carry screws 53 facing inwardly toward each other to clamp the prism 37 between them, to prevent accidental turning of the prism if the operator's hand comes into contact with it during manipulation of the light impeding screen. Beneath the bars 51, the flanges 50 are tapped to receive the rear screw threaded ends of two rods 55 which extend forwardly approximately in a horizontal plane slightly below the bottom edge of the prism 37 as shown, the rods being laterally outside of the vertical side walls of the prism, or at least outside of the extreme side edges of the pyramid of light rays passing from the maximum area of the document on the copyholder 21 to the prism 37. Hence these rods do not in any way obstruct the field of view of the camera. The forward ends of the two rods 55 are connected to each other by a cross bar 56 secured to the rods by screws 57, the bar 56 being outside of the maximum pyramid of light rays.

These rods 55 constitute rails forming a trackway for sliding screen means shiftable back and forth along the trackway from a non-effective position to an effective position. The screen means is made of light impeding material, but is not necessarily impervious to light. For example, the screen means may be of glass or other suitable transparent sheet material, colored or smoked so as to reduce the transmission of light through it, without cutting off all light. On the other hand, the light impeding screen means may be entirely opaque, such as a sheet of metal or the like, and this construction is usually preferred under most circumstances, especially where the lighting of the copyholder is such that the under exposed areas are confined to two marginal zones along two opposite edges of the exposure area. The screen means may thus comprise an opaque metal plate 60, of generally rectangular shape, having two bent down ears on opposite side edges of the plate 60 near one end thereof, with holes in them through which one of the rods 55 passes. The other end of the plate may be doubled back upon itself to extend around the other rod 55, as indicated at 62. A finger piece or handle 63 secured to a bent down flange 64 at one end of the screen constitutes readily accessible means for moving the screen back and forth along the trackway rails 55.

In the preferred form, the screen means 60 is of a length to extend from one of the rails 55 to the other, so that it extends completely across the field of view of the camera from one side to the other. The width of the screen means 60, however, is materially less than its length so that when the screen is centered under the prism, light may still pass from the object on the copyholder 21 to the prism in front of and behind the screen 60, to be projected on the top and bottom marginal portions of the exposure area 30. Usually the width of the screen may be from one-third to one-half of the corresponding dimension, in the plane of the screen, of the maximum cone or pyramid of light rays; that is, from one-third to one-half of the distance in the horizontal plane of the screen 60, from the extreme forward rays 42 to the extreme rearward rays 43, in the diagrammatic showing of Fig. 1. The exact dimensions of the screen and the proportions of its width to the dimensions of the cone or pyramid of light rays can be varied in accordance with the judgment of the photographic expert, within reasonable limits.

Abutment means or stop means is provided to limit the movement of the screen means in one direction so that when it is moved in that direction to the limit of its motion, it will be properly centered under the prism. This abutment means or limiting means may comprise a short tube 66 around one of the rods 55 between the screen 60 and the member 56. When the finger piece 63 is grasped and moved forwardly (that is, in a rightward direction when viewed as in Figs. 1, 2, and 5), the front ear 61 on the screen 60 will come into contact with the rear edge of the tube 66, which can not move farther forwardly because it is held by the member 56, and this will stop the forward movement of the screen in the position shown in Fig. 5, where the screen is properly centered under the prism 37 in such position that light rays may pass the front and rear edges of the screen and reach the prism from the forward and rear marginal portions of the object on the copyholder 21.

If the finger piece 63 be moved rearwardly or to the left when viewed as in Figs. 2 and 5, the screen is then moved rearwardly toward the shutter casing 32 until it comes into contact with some fixed part of the mechanism, such as the flanges 50 which thus limit the motion of the screen in this direction. When the screen is moved to the limit of its motion in this rearward direction, it is entirely out from under the prism 37, as shown in Fig. 2, and in a non-effective position in which it does not interfere or impede any light rays passing toward any part of the exposure area.

In use, an exposure can be made in the usual manner with the screen 60 in its rearward non-effective position indicated in Fig. 2, which exposure is of the proper length with respect to the central portion of the print or reproduction to be made. The screen may be shifted to its effective position indicated in Fig. 5, and a supplemental exposure may be made, to give the upper and lower marginal portions of the exposure area enough additional exposure to compensate for the lesser degree of illumination of the corresponding portions of the copy or object and the greater distance of these portions from the corresponding marginal portions of the exposure area, with respect to the illumination of the central portion of the copy and its distance from the central portion of the exposure area. During this supplemental exposure, the central portion of the exposure area will not be further exposed, at least to any great extent, because of the light impeding or blocking off effect of the screen means, but the upper and lower marginal portions will be further exposed. The supplemental exposure may be made either before or after the main exposure. The camera shutter may be closed after one exposure and opened again for the second one, or the screen means 60 may be shifted from one position to the other by a quick movement while leaving the camera shutter open, particularly if a relatively slow photographic emulsion is used.

The screen means 60, being close to the prism 37, is so far out of focus with respect to the exposure area 30 that when the screen means is in its effective position, the image of its edges will not form sharp or noticeable lines on the photographic print, but will be soft and blurred. If a greater degree of softening and blurring of the edges of the screen is desired, these edges instead of being made straight, can be indented or made of toothed form as indicated at 70 in the modification shown in Fig. 8 of the drawings. The screen, here indicated at 60a, is otherwise the same as the screen 60 previously described, and is similarly mounted, the only difference being in the use of the saw tooth-like edges 70 in place of the plain straight edges.

In the construction so far described, the screen means when in its effective position, is interposed in the path of the light rays between the object or copy to be photographed, and the lens means. If desired, the screen means may be mounted somewhat differently so that it is interposed in the light rays between the lens means and the exposure area 30, such an alternative construction being shown by way of example in Figs. 9 to 12, inclusive, which will now be described.

In this alternative construction all of the parts except the screen means and its mounting may be identical with the corresponding parts previously described, and such parts are indicated in Figs. 9 to 12 by the same reference numerals used in Figs. 1 to 7, with the addition of the letter *a* to each numeral.

Within the shutter casing 32a is a transverse partition 80 having an aperture 81 therein through which the light rays may pass, when the shutter is open, from the lens means to the exposure area 30. On the rear surface of this partition 80 to one side of the aperture 81 is a bracket 82 carrying at its upper and lower ends ears 83 with vertically alined holes in them. In these holes is journaled a vertical shaft 84 to which is pinned a screen member 85, which may be of any of the materials previously mentioned in connection with the screen 60. The screen 85 is preferably of metal. An arm 86 pinned to the shaft 84 near its upper end in a horizontal plane above the top of the aperture 81 is connected to suitable operating means such as the cord 87 which passes out through the side wall of the casing 32a through a light tight bushing 88, to an accessible external finger piece 89 which may be grasped manually to control the movements of the screen 85.

A coiled spring 90 surrounding the shaft 84 has one end engaged behind a screw 91 on a lug 92 of the bracket 82, and the other end engaged behind a screw 93 on the arm 86. This spring constantly tends to turn the arm 86, the shaft 84, and the screen 85 in a clockwise direction when viewed from above as in Figs. 11 and 12, so as to swing the screen 85 to an open or ineffective position, the motion of the screen in this direction being limited by contact between the bracket 82 and an extension 95 on the arm 86. When the operating means 87 is pulled from an external point, the screen is swung against the tension of the spring 90, from the open or non-effective position shown in Fig. 11, to the closed or effective position shown in Fig. 12, the extent of movement in this direction being limited by contact of the screen with a plug 97 of felt, rubber, or other suitable material set in a recess in the rear side of the wall 80.

The member 97 thus defines the limit of motion of the screen in one direction, and the arm 95 defines the limit of motion of the screen in the opposite direction, the screen being capable of moving back and forth between these two limits of motion in accordance with the operation of the control means 87. When the screen is shifted to its effective position shown in Fig. 12, and indicated in dotted lines in Fig. 10, it extends in a horizontal zone completely from one side to the other across the path of the light rays passing toward the central part of the exposure area 30, but leaves substantial space for light rays to pass above and below the screen 95 to the upper and lower marginal parts of the exposure area 30. Hence, by placing the screen in its effective light impeding position, the upper and lower marginal parts of the exposure area of the print can be given a substantial exposure without exposing the central portion of the print. The operation or manner of use of this alternative form of the invention is, therefore, the same as that of the form previously described.

This alternative from has one advantage in that the screen means may still be used if the prism 31a is removed entirely, as is sometimes desirable in certain photographic operations. In the previous embodiment described in connection with Figs. 2 to 7, inclusive, it is evident that the screen means can no longer be used when the prism is removed.

Sometimes it is desirable to hang a large object to be photographed upon a wall at one side of the camera, and to turn the prism 90° about its horizontal axis in order that the camera may photograph the object on the wall. Both embodiments of the invention above described are capable of use in this manner. The ring 132 above mentioned is provided with two holes 133 on one diameter, and two other holes on another diameter at exactly 90° to the first mentioned diameter. The ring is secured to the front wall of the shutter casing by screws 135 with knurled heads so that they may be easily screwed up and unscrewed by hand, these screws extending through the ring 132 and into threaded openings in the front wall of the shutter casing 32 or 32a.

When the prism is normally placed to point downwardly to photograph objects on the horizontal copyholder 21, the screws 135 are passed through one set of holes 133 on one diameter, in such manner that the prism points downwardly as shown in Figs. 2, 5 and 7. If it is desired to photograph an object hung on a wall, as above mentioned, then the screws 135 are removed, the entire ring 132 is turned through exactly 90°, carrying with it the lens casing, the prism, and associated parts, and the screws 135 are inserted through the other two holes 133, on the other diameter of the ring, but into the same threaded holes in the shutter casing. This secures the prism and associated parts to the shutter casing in the sideways position shown in Fig. 13, instead of in the previous position shown in Fig. 7. This prism itself is not turned relatively to the ring, and does not need to be levelled up again after the ring is turned back to its initial position to point the prism downwardly. Since the rails 66 which carry the exposure controlling shutter 60 are mounted rigidly on the ring 132, the exposure controlling mechanism is turned with the turning of the ring, as a unit therewith, and still remains in the path of the rays passing from the object to the prism even if the prism has been turned through 90°. Hence, in the embodiment where the exposure controlling screen is on the exterior of the camera, as in Figs. 1 to 8, and 13, the exposure controlling means may be used equally well when the prism is turned to point sideways, as shown in Fig. 13.

In the second illustrated embodiment of the invention, shown in Figs. 9 to 12, inclusive, the exposure controlling screen is not affected or moved by turning the prism sideways, but the same mounting of the prism and lens casing on the ring 132a which can be turned in the manner above described, promotes easy shifting of the prism back and forth from the downwardly pointing position shown in Fig. 9 to the sideways position shown in Fig. 12.

While a completely opaque screen, such as a sheet of metal, is preferred in most instances, yet the above mentioned smoked or colored transparent screen has same advantages in special instances. For example, under special lighting conditions, it may be that the central portion of the print should be exposed least of all, and a zone around this central portion should be exposed to a greater extent, and the marginal portions of the print exposed to a still greater extent. The light impeding screen could then be made of glass or other transparent material with the central portion thereof smoked or colored quite darkly, and with a zone around this central portion smoked or colored to a lesser extent. Therefore, when the screen is placed in its effective position of use, and an exposure is made, the screen would not impede the light rays passing to the marginal portions of the print. It would impede to some extent the light rays passing to a zone between the central portion and the marginal portions, while still allowing some exposure in this zone of the print, and it would impede to a greater extent or perhaps even to a total extent the light rays passing toward the central portion of the print.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. Photographic apparatus comprising a copyholder, a camera having means for holding a sheet of sensitized material in position to be exposed and lens means for projecting light from an external object positoned on said copyholder onto said sensitized sheet to make an exposure, elongated tubular illuminating means positioned adjacent each of two opposite edges of said copyholder, and shiftable screen means mounted on said camera and having one position in the path of light tending to pass toward the central part of said sensitized sheet from a central zone of said copyholder extending transversely of said illuminating means and out of the path of light tending to pass toward two opposite marginal portions of said sheet from marginal zones of said copyholder on two opposite sides of said central zone, so that when said screen means is in said position it will reduce the exposure of the central portion of said sheet without reducing the exposure of said two marginal portions thereof, said screen means being shiftable from said position to a different position substantially entirely out of the path of light tending to pass toward all parts of said sensitized sheet.

2. Photographic apparatus comprising a camera having lens means for collecting light rays from an object to be photographed which is less brilliantly illuminated near two opposite margins than at its central portion between said margins and projecting said rays upon an exposure area, light impeding screen means movably mounted adjacent said lens means for movement back and forth through a limited range of movement, and abutment means for limiting both ends of said range of movement, said abutment means being so placed and the size of said screen means being such that when said screen means is at one end of its range of movement it is substantially entirely out of the path of all of said light rays, and when said screen means is at the opposite end of its range of movement it extends substantially transversely across said rays substantially centrally thereof so as to be interposed in the path of light rays passing from said central portion of said object toward the central part of said exposure area while being out of the path of light rays passing from said less brilliently illuminated margins of said object toward corresponding marginal portions of said exposure area.

3. Photographic apparatus of the type including a camera having lens means for collecting light rays from an object to be photographed and projecting them upon an exposure area, a copyholder for holding the object to be photographed, and two elongated tubular lights, one adjacent each of two opposite marginal edges of said copyholder, characterized by screen means mounted for movement back and forth through a limited range of movement from one extreme position to another, motion limiting means for determining said extreme positions, said screen means including an opaque blade which, when said screen means is in one of said extreme positions, lies across the path of the central part of said light rays to intercept a portion of said rays passing toward the central part of said exposure area from a central zone of said copyholder embracing the full width of the object to be photographed in a direction transverse to said lights, without intercepting a portion of said rays passing beyond opposite side edges of said blade and toward opposite marginal portions of said exposure area from transverse marginal zones of said copyholder on opposite sides of said central zone, said blade, when said screen means is in the other of said extreme positions, being in non-intercepting relationship to all of said light rays passing toward all parts of said exposure area, and means accessible externally of said camera for causing movement of said screen means at will from one of said extreme positions to the other.

4. A construction according to claim 2, in which said screen means is located between said object to be photographed and said lens means.

5. A construction according to claim 2, in which said screen means is located between said lens means and said exposure area.

6. Photographic apparatus comprising a camera having lens means for collecting light rays from an object to be photographed which is less brilliantly illuminated near two opposite margins than at its central portion between said margins and projecting said rays upon an exposure area, a pair of rails lying substantially in a common plane transverse to the direction of said light rays, said rails being laterally outside of the path of light rays passing toward said exposure area, and light impeding screen means mounted on said rails for movement therealong from one position to another, the size of said screen means being such that when it is in one position on said rails it will be in intercepting relationship to light rays passing from said central portion of said object toward the central portion of said exposure area and in non-intercepting relationship to light rays passing from said less brilliantly illuminated margins of said object toward corresponding marginal portions of said exposure area on two opposite sides of said central portion, said screen means being shiftable along said rails to another position in non-intercepting relationship to light rays passing from all portions of said object toward all portions of said exposure area.

7. Photographic apparatus comprising a substantially horizontally arranged copyholder, a camera including lens means having an optical axis arranged substantially horizontally above said copyholder, light-bending prism means arranged over said copyholder and in line with said optical axis so that light rays from an object on said copyholder may pass upwardly to said prism means and thence through said lens means to be projected thereby onto an exposure area of the camera, the position and illumination of said object being such that the image on said exposure area of two opposite marginal portions of said object will be fainter than the image of the central portion of said object, and light impeding screen means mounted for movement back and forth between an effective position and a non-effective position, said light impeding means being of such size that when it is in said effective position it will be across the path of said light rays beneath and close to said prism means in intercepting relationship to rays passing from said central portion of said object toward the central portion of said exposure area and in non-intercepting relationship to other rays passing from said two opposite marginal portions of said object toward corresponding marginal portions of said exposure area, said light impeding means when in said non-effective position being in non-intercepting relationship to all of said rays passing toward all portions of said exposure area.

8. A construction according to claim 7, further including substantially horizontally arranged track means along which said light impeding means is slidable from one of said positions to the other.

9. Photographic apparatus comprising a camera having lens means for collecting light rays from an object to be photographed which is less brilliantly illuminated near two opposite margins than at its central portion between said margins and projecting said rays upon an exposure area, and light impeding screen means pivotally mounted for oscillating movement back and forth from one position to another, said screen means being of such size that when it is in one of said positions it will be in intercepting relationship to light rays passing from said central portion of said object toward the central portion of said exposure area and in non-intercepting relationship to light rays passing from said margins of said object toward corresponding marginal portions of said exposure area on two opposite sides of said central portion, said screen means when in another position being in non-intercepting relationship to light rays passing toward all portions of said exposure area.

10. Photographic apparatus comprising a substantially horizontally arranged copyholder, a camera including lens means having an optical axis arranged substantially horizontally above said copyholder, light-bending prism means arranged over said copyholder and in line with said optical axis so that light rays from an object on said copyholder may pass upwardly to said prism means and thence through said lens means to be projected thereby onto an exposure area of the camera, the position and illumination of said object being such that the image on said exposure area of two opposite marginal portions of said object will be fainter than the image of the central portion of said object, and light impeding screen means mounted for movement back and forth between an effective position and a non-effective position, said light impeding means being of such size that when it is in said effective position it will lie across the path of said light rays relatively closely behind said lens means between said lens means and said exposure area and materially out of focus with said object and in intercepting relationship to rays passing from said central portion of said object toward the central portion of said exposure area and in non-intercepting relationship to other rays passing from said two opposite marginal portions of said object toward corresponding marginal portions of said exposure area, said light impeding means when in said non-effective position being in non-intercepting relationship to all of said rays passing toward all portions of said exposure area.

11. A construction according to claim 10, further including means passing through a wall of said camera in light tight relation thereto for controlling oscillating movement of said light impeding means from a point externally of said camera.

12. A construction according to claim 9, further including resilient means constantly tending to move said screen means to its non-intercepting position.

13. A construction according to claim 1, further including resilient means constantly tending to shift said screen means toward said different position entirely out of the path of light.

14. Photographic apparatus comprising a camera including means forming a dark chamber, means for holding a sheet of sensitized material within said dark chamber in position to be exposed, a fixed part, a member movable with respect to said fixed part, means for holding said member with respect to said fixed part in either one of two positions at right angles to each other, lens and prism means mounted on and movable bodily with said movable member, and light impeding screen means shiftable from an ineffective non-impeding position to an effective position impeding part but not all of the light rays tending to pass from an object to be photographed through said lens and prism means to said sensitized material, said screen means being mounted for cooperation with said light rays when said movable member is in either one of said two positions with respect to said fixed part.

WILLARD A. BRORSEN.

CERTIFICATE OF CORRECTION.

Patent No. 2,124,134.                                  July 19, 1938.

WILLARD A. BRORSEN.

It is hereby certified that error appears in the printed specification of the above numbered patent requiring correction as follows: Page 4, second column, line 41, for the word "same" read some; and that the said Letters Patent should be read with this correction therein that the same may conform to the record of the case in the Patent Office.

Signed and sealed this 16th day of August, A. D. 1938.

(Seal)

Leslie Frazer
Acting Commissioner of Patents.